(12) United States Patent
Hsu et al.

(10) Patent No.: US 6,275,096 B1
(45) Date of Patent: Aug. 14, 2001

(54) CHARGE PUMP SYSTEM HAVING MULTIPLE INDEPENDENTLY ACTIVATED CHARGE PUMPS AND CORRESPONDING METHOD

(75) Inventors: Louis L. C. Hsu, Fishkill; Oliver Weinfurtner, Wappingers Falls; Matthew R. Wordeman, Mahopac, all of NY (US)

(73) Assignees: International Business Machines Corporation, Armonk, NY (US); Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/460,820

(22) Filed: Dec. 14, 1999

(51) Int. Cl.[7] ........................................................ G05F 3/02
(52) U.S. Cl. ................................................. 327/535; 327/534
(58) Field of Search .................................... 327/534, 535, 327/536, 537

(56) References Cited

U.S. PATENT DOCUMENTS

| Re. 35,141 | * | 1/1996 | Ozaki et al. | 365/226 |
|---|---|---|---|---|
| 4,961,007 | * | 10/1990 | Kumanoya et al. | 327/536 |
| 5,034,625 | * | 7/1991 | Min et al. | 327/535 |
| 5,072,134 | * | 12/1991 | Min | 327/536 |
| 5,410,510 | | 4/1995 | Smith et al. | 365/201 |
| 5,426,334 | * | 6/1995 | Shovmand | 327/427 |
| 5,734,291 | | 3/1998 | Tasdighi et al. | 327/537 |
| 5,781,473 | * | 7/1998 | Javanifard et al. | 365/185.18 |
| 5,818,766 | | 10/1998 | Song | 327/536 |
| 5,982,222 | | 11/1999 | Kyung | 327/536 |
| 6,020,781 | | 2/2000 | Fujioka | 327/541 |
| 6,031,411 | * | 2/2000 | Tsay | 327/536 |
| 6,041,011 | | 3/2000 | Umezawa et al. | 327/537 |
| 6,052,022 | * | 4/2000 | Lee | 327/589 |
| 6,107,862 | | 8/2000 | Mukainakano et al. | 327/536 |

* cited by examiner

Primary Examiner—Terry D. Cunningham
(74) Attorney, Agent, or Firm—Daryl K. Neff; Todd M. C. Li

(57) ABSTRACT

A charge pump generator system and method is provided which more precisely maintains the level of an internally generated voltage supply by operating some or all of the available charge pumps depending upon the voltage level reached by the voltage supply. When the voltage supply is far from its target level, a first group and a second group of charge pumps are operated. The first group may preferably have a faster pumping rate or a greater number of charge pumps than the second group. When the voltage supply exceeds a first predetermined level, the first group of charge pumps is switched off while the second group remains on, such that the rate of charge transfer slows. The second group continues operating until a second, e.g. target, voltage level is exceeded. The slower rate of charge transfer then effective reduces overshoot, ringing and noise coupled onto the voltage supply line. Preferably, at least one charge pump operates in both standby and active modes, thereby reducing chip area.

9 Claims, 8 Drawing Sheets

CHARGE PUMP SYSTEM HAVING MULTIPLE INDEPENDENTLY ACTIVATED CHARGE PUMPS AND CORRESPONDING METHOD

RELATED APPLICATION DATA

This application is related to U.S. patent application Ser. No. 09/430,807 entitled "Charge Pump System Having Multiple Charging Rates and Corresponding Method", filed Oct. 29, 1999 the entirety of which is hereby incorporated by reference.

FIELD OF THE INVENTION

This invention relates to integrated circuits and more specifically to a circuit and method for maintaining a supply voltage generated internally within an integrated circuit.

BACKGROUND OF THE INVENTION

It is often necessary to generate a supply voltage internally within an integrated circuit. Memory circuits, for example, may require the internal generation of a specialized supply voltage as a boosted wordline supply voltage (for example at 3.3V) or as a negative wordline low supply (for example at −0.5V). A charge pump is a device readily incorporated onto an integrated circuit which can be used to generate and maintain an internal supply voltage from an external voltage supply.

By way of illustration only and not intended to limit the meaning of "charge pump" to that particularly shown, FIG. 9 shows a simple schematic for a charge pump 250 used to generate a supply voltage Vout from a first constant voltage input Vdd. The charge pump 250 receives a CLK input, which determines the charge transfer rate, and a control signal P1, which controls on-off switching of the charge pump. As will be understood, CLK provides the charge pump clock signal Vclk and its inverse /Vclk at which capacitors CP2 and CP1 are alternately held. During a first half cycle of CLK, Vclk is held high, /Vclk is held low and CP1 is charged from the voltage input Vdd such that the voltage on CP1 rises toward /Vclk+Vdd. During a second half cycle of CLK, Vclk falls low, while /Vclk is raised high. This causes the potential on CP1 to rise, while the potential on CP2 temporarily falls such that charge stored on CP1 is transferred to CP2. Finally, during a second full cycle of CLK, charge is transferred from CP2 onto the generated voltage supply output Vout.

Demand for current from a supply voltage varies depending on the operational state of the integrated circuit. For example, in many systems such as computers and printers, a memory chip is sometimes operated in an active mode in which relatively high current is required; for example, to access data on the chip, and at other times is operated in a standby mode or "sleep mode" in which relatively little current is required, such as is required to merely protect internal steady state voltage levels, e.g. Vbleq against leakage currents when no memory cells are accessed.

FIG. 10 shows an example of a prior art charge pump system having both active charge pumps 124 and a standby charge pump 126. The active pumps 124 are enabled by a "pump enable" signal P1, while the standby charge pump 126 remains continuously enabled to supply current to the chip, such as is required to maintain the voltage level of the supply Vout against degradation from charge leakage. The active pumps 124 are designed to meet the large demands for current of active operation and therefore, have a higher pumping rate, i.e. have higher capacity or higher charge transfer rate, than the standby charge pump 126. On the other hand, the standby charge pump 126 is designed to consume little power and to maintain the output voltage at a nearly constant level for long periods of time and thus is designed with a lower pumping rate, i.e. is slower.

The standby pump 126 is only needed to replenish the charge that leaks away during standby mode or sleep mode, when no wordlines are activated within the chip. At any time that a wordline is activated for access to a stored bit or for a refresh operation, the active pumps are switched on. The standby charge pump 126 operates continuously at a single and slower speed compared to the active pump; i.e., based on a CLK frequency that does not change. Heretofore, because the standby charge pump was continuously operated at lower output current than active charge pumps, the standby pump had to be designed as a separate unit dedicated to that function. However, although the standby charge pump 126 provides considerably less output current than an active charge pump 124, the chip area required to implement the standby charge pump 126 is comparable to that required to implement the active charge pump 124.

FIG. 11 is a timing diagram illustrating the operation of the prior art charge pump system shown in FIG. 10. Active charge pumps 124 are conventionally driven by a ring oscillator that has a fixed output frequency which functions as a CLK input to the charge pump in a similar manner to the charge pump described above with reference to FIG. 9. Consequently, in an "active interval" of operation, active charge pumps 124 cause the output voltage to rise and fall relatively quickly, because the active charge pumps 124 can only be activated or deactivated based on the output voltage Vout exceeding a single reference voltage Vref. The level of "ringing" depends on the limiter speed and the impedance of the wiring. A limiter with a slower feedback speed and high wiring resistance results in higher level of ringing. This is because when the limiter detects the output level below the target level, it will activate a control signal (not shown) to turn the pump on. First, it takes time to trigger the control signal, then it takes more time to communicate the control signal along the wiring back to the charge pump. During these times, the voltage level will continue to undershoot. Similarly, when the limiter detects the output level has reached the target level, it generates a control signal to shut off the charge pump. However, the delay in generating the control signal and communicating it back to the charge pump causes the voltage level to overshoot.

One way to reduce such ringing would be to utilize a high speed limiter. However, high speed limiters are generally considered unsuitable because of their high power consumption owing to the use of a resistive voltage divider and a differential amplifier which draw high DC current. Another possibility would be to decrease wiring impedance by using wider conductors. However, doing so would directly contribute to an increase in chip area. The relatively large "ringing" in the Vout voltage level introduces noise into the memory chip. The standby charge pump 126 also operates during the active interval, but its output current has little effect upon the rise and fall of Vout, its output current being much smaller than that of the active charge pumps 124.

In a standby interval of operation, the active pumps 124 are switched off by the pump enable signal P1 becoming disabled. However, the standby pump 126 is not disabled, but continues to operate when needed to restore the output voltage Vout to its target level. In this manner the output voltage Vout is maintained at or near its target level during both active and standby intervals.

It is an object of the present invention to provide a charge pump system in which the dedicated standby charge pump is eliminated, thereby reducing the layout area on the semiconductor chip.

It is another object of the invention to provide a charge pump system in which the rate of charge transfer to the voltage supply varies as a function of the voltage level reached by the voltage supply.

Still another object of the invention is to provide a charge pump system in which different groups of charge pumps are independently switched on and off in response to the voltage supply reaching different predetermined voltage levels.

Still another object of the invention is to more precisely control the voltage supply level by varying the rate of charge transfer thereto based on the voltage level reached, thereby reducing the amount of ringing and noise coupled onto the voltage supply line.

SUMMARY OF THE INVENTION

These and other objects of the invention are provided by the multiple charging rate charge pump system and method of the present invention.

The charge pump system operates such that when the level of the generated voltage supply is lower than a first predetermined level, first and second charge pump groups are operated to increase the voltage rapidly towards its target level. When the voltage exceeds a first predetermined level, the first group of charge pumps is switched off, but the second group continues to operate to increase the level of the voltage supply, albeit at a slower rate than before. Finally, when the voltage supply is raised to a level exceeding a second predetermined level (generally corresponding to the target voltage level), the second group of charge pumps is turned off, as well.

At that time, preferably one charge pump is left switched on as a standby charge pump operating at a slower speed to assist in maintaining the target voltage level. When the voltage drops again below the second predetermined level, the second group of charge pumps are turned on again to increase the voltage again, at the slower rate, to the target level. However, if the second group of charge pumps do not output sufficient power, the voltage will drop below the first predetermined voltage level. In such case, the first group of charge pumps will be switched on again in parallel with the second group, such that the rate of charge transfer is increased and the voltage is restored again to its target level.

Although the embodiments shown below only describe charge pump control with respect to the generated voltage supply reaching each of two predetermined levels, it will be understood by those skilled in the art how the principles and teachings of the invention are applied to a system in which control is effected with respect to more than two voltage levels. With the present invention, the output voltage level is maintained with much tighter control and without the aforementioned disadvantages of using a high speed limiter or wider wiring patterns.

DETAILED DESCRIPTION OF THE PREFERRED EMBODIMENTS

Figure 1:
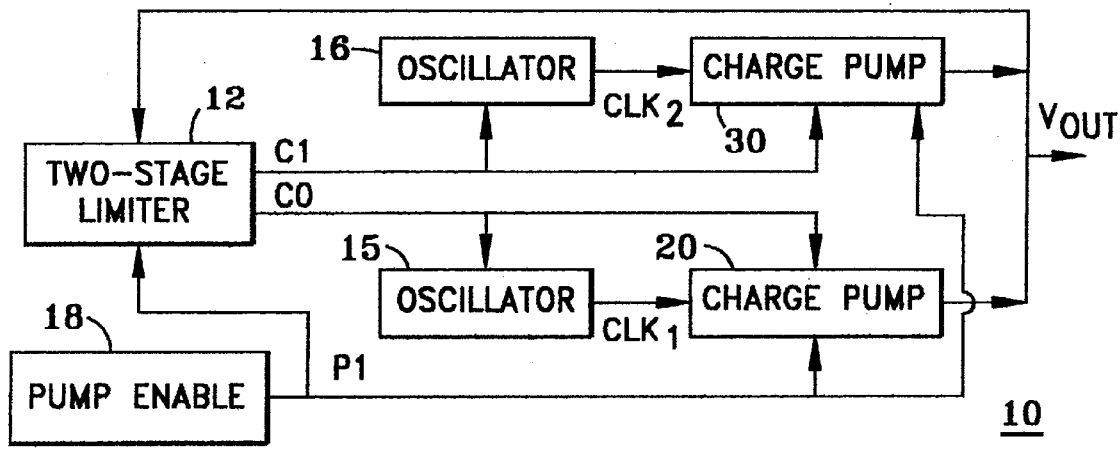
FIG. 1 is a block diagram showing a charge pump system constructed according to a first embodiment of the invention.

FIG. 1 is a block diagram showing a generator system 10 according to a first embodiment of the invention. In this embodiment, as in other embodiments described herein, the transfer of charge from a charge pump 20 to a generated voltage supply Vout is controlled in response to the voltage supply Vout reaching multiple predetermined voltage levels. The generator system includes a two-stage limiter 12 which changes the state of control signals C0 and C1 output therefrom in response to the voltage level reached by Vout. Control signals C0 and C1 are provided as inputs to oscillators 15 and 16, respectively, and to charge pumps 20 and 30, respectively. Charge pumps 20, 30 and limiter 12 receive an enabling input P1 from pump enable circuitry 18. Control signals C0 and C1 control the on-off switching of charge pumps 20 and 30, respectively.

Figure 3:
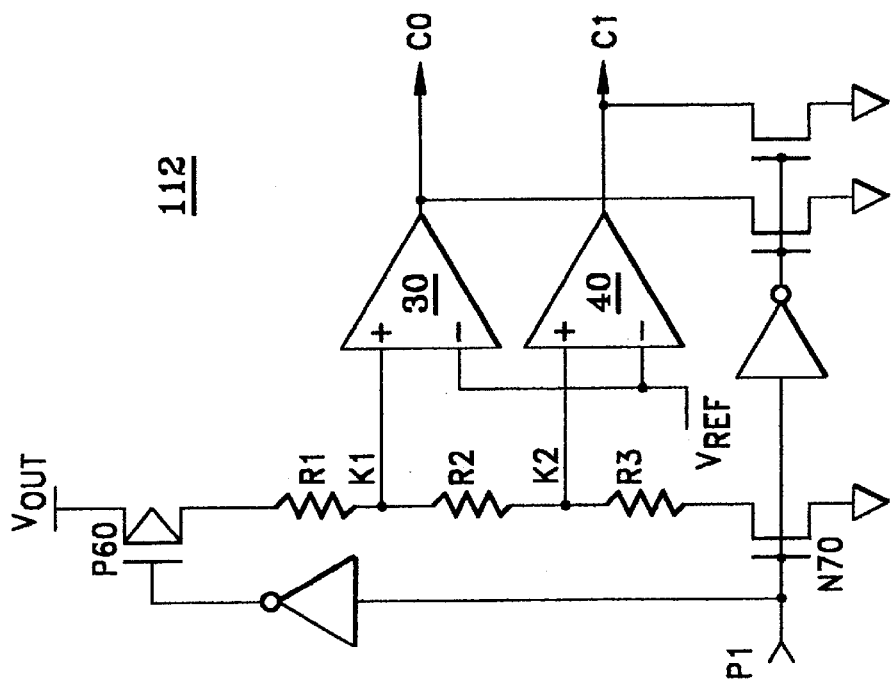
FIG. 3 is a schematic diagram of a two-stage limiter 112.

FIG. 3 shows a schematic drawing of a two-stage limiter 112 which can be used as limiter 12 shown in FIG. 1. Limiter 112 includes a resistive divider formed by the series-connected resistors R1, R2 and R3 connected across Vout by transistor pair P60 and N70. The resistive divider provides output voltages K1 and K2 which lie in predetermined relation to Vout. Differential amplifier 30 deactivates a control signal C0 in response to the divided voltage K1 exceeding a fixed reference voltage Vref. Differential amplifier 40 operates in the same manner to deactivate a control signal C1, except that it operates in relation to the divided voltage K2. The two-stage limiter is switched on and off by a pump enable signal labeled P1 which enables and disables the generator system by controlling the transistor switches pMOS P60 and nMOS N70 together. Thus, while Vout is below a first voltage level V1, limiter 112 holds control signals C0 and C1 in a high state. Then, when Vout reaches the voltage V1, limiter 112 deactivates control signal C0. Finally, when Vout reaches the voltage V2, limiter 112 deactivates control signal C1.

Figure 2:
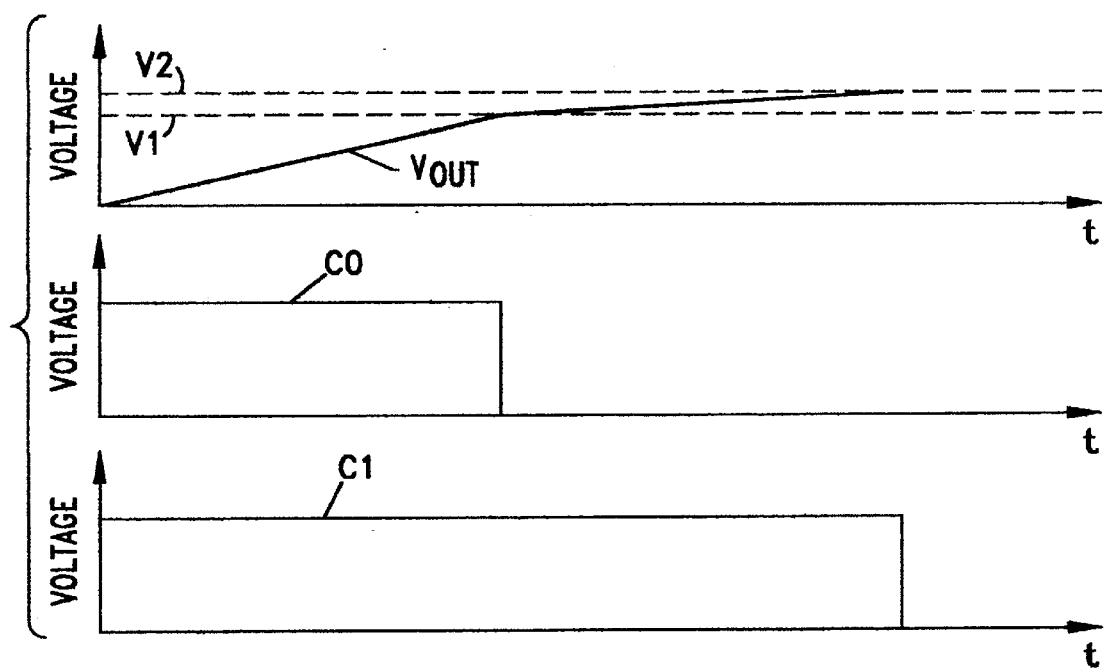
FIG. 2 is a timing diagram showing the activation of control signals C0 and C1 in relation to the voltage supply level.

In operation, as illustrated in FIG. 2, when the charge pump system 10 is first turned on, the level of voltage supply Vout is below a first predetermined voltage level V1. Limiter 12 holds control signals C0 and C1 high to cause both oscillators 15 and 16 and both charge pumps 20 and 30 to operate. In response to the voltage supply reaching a first predetermined voltage level (V1), limiter 12 deactivates control signal C0 which turns off oscillator 15 and charge pump 20, thereby decreasing the rate of charge transfer onto the voltage supply Vout because only one charge pump is then operating. When the voltage supply reaches a second predetermined voltage level (V2), limiter deactivates control signal C1, which in turn, deactivates oscillator 16 and charge pump 30, thereby stopping the transfer of charge onto the voltage supply Vout.

Figure 9:
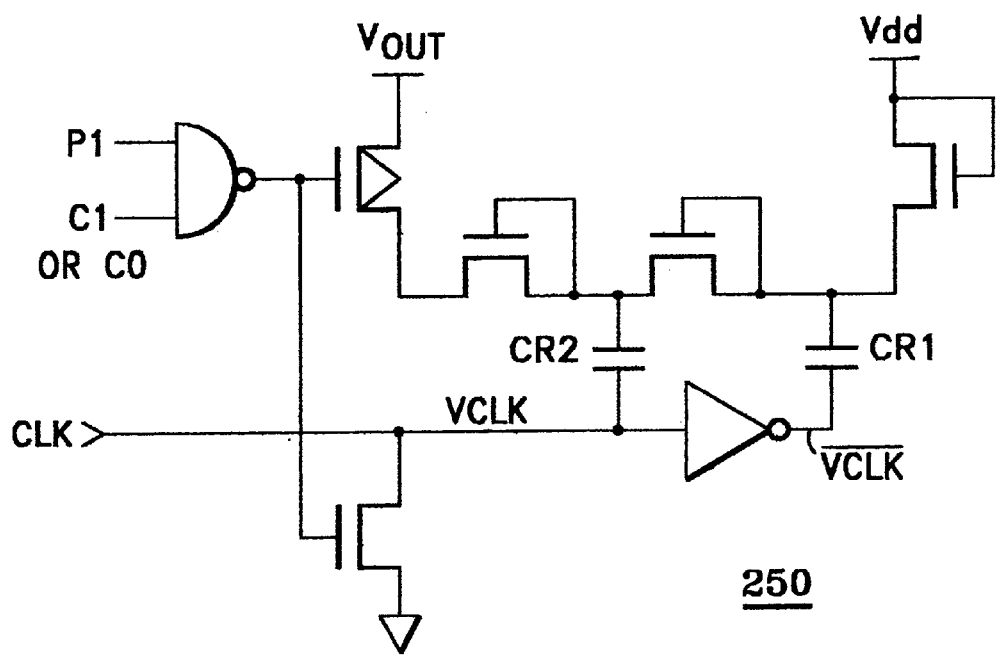
FIG. 9 is a schematic diagram illustrating an exemplary prior art charge pump.
Figure 10:
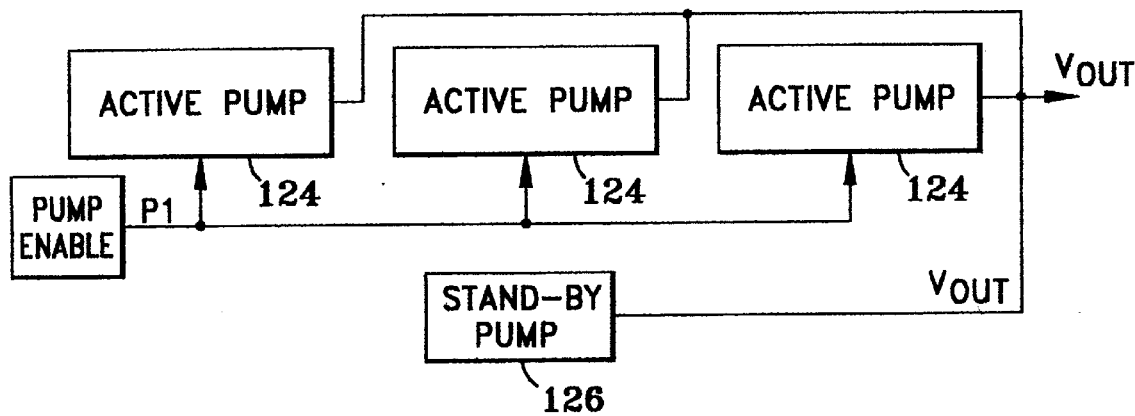
FIG. 10 is a block diagram illustrating a prior art charge pump system.
Figure 11:
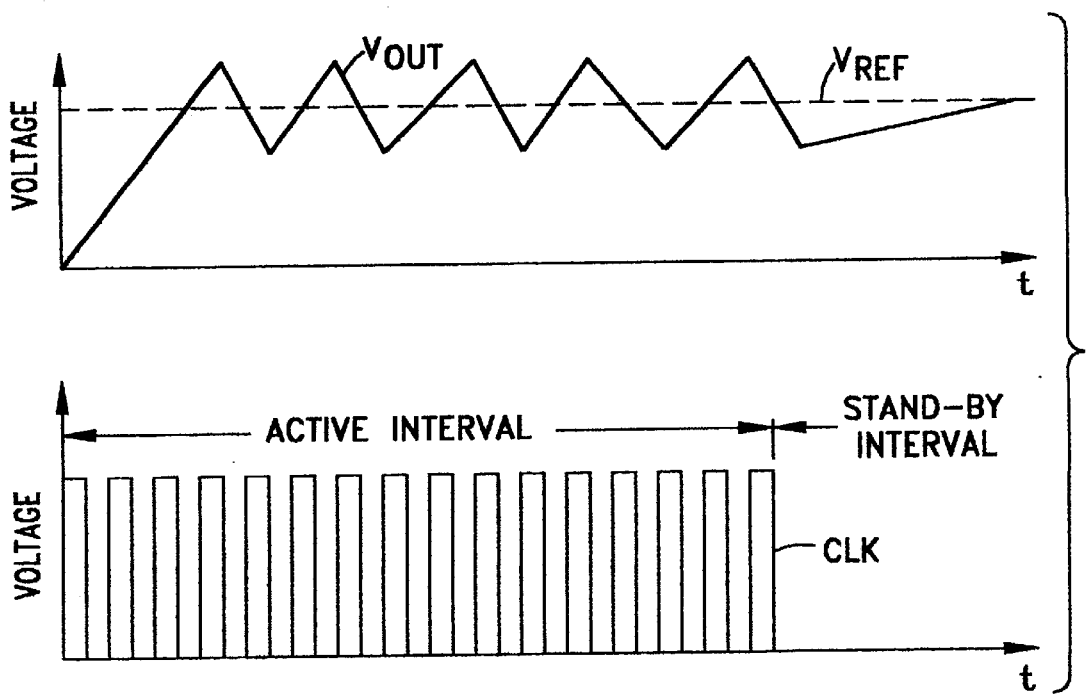
FIG. 11 is a timing diagram illustrating the operation of the prior art charge pump system shown in FIG. 10.

Depending upon the anticipated current delivery from the voltage supply Vout under particular conditions, the charge transfer rate of the charge pumps 20 and 30 can be purposely set to different values. The charge transfer rate is determined by parameters such as the output frequency of oscillators 15 and 16, the number of charge pumps controlled by a particular control signal C0 or C1, the capacitance of reservoir capacitors CR1, CR2 (see FIG. 9) within each charge pump 20 or 30, and the external voltage Vdd which powers each charge pump 20 or 30. For example, when Vout lies below V1, it may be desirable to operate the pump system 10 at a high rate of charge transfer which is more than double the rate which exists when V1 is exceeded. In such case, a greater charge transfer rate is required from charge pump 20 than from charge pump 30.

To provide a greater charge transfer rate in charge pump 20, any or all of the following changes can be made. The output frequency of oscillator 15 can be set higher than the output frequency of oscillator 16. The number of charge pumps 20 which are controlled by signal C0 can be increased to a number greater than the number of charge pumps 30. The capacitance of reservoir capacitors CP1, CP2 or the level of the external voltage supply Vdd used in one or more charge pumps 20 can be increased to values greater than those used in charge pump 30. Those skilled in the art would recognize variations of the above parameters which would provide for relative differences in the charge transfer rate between charge pumps 20 and 30.

Figure 5:
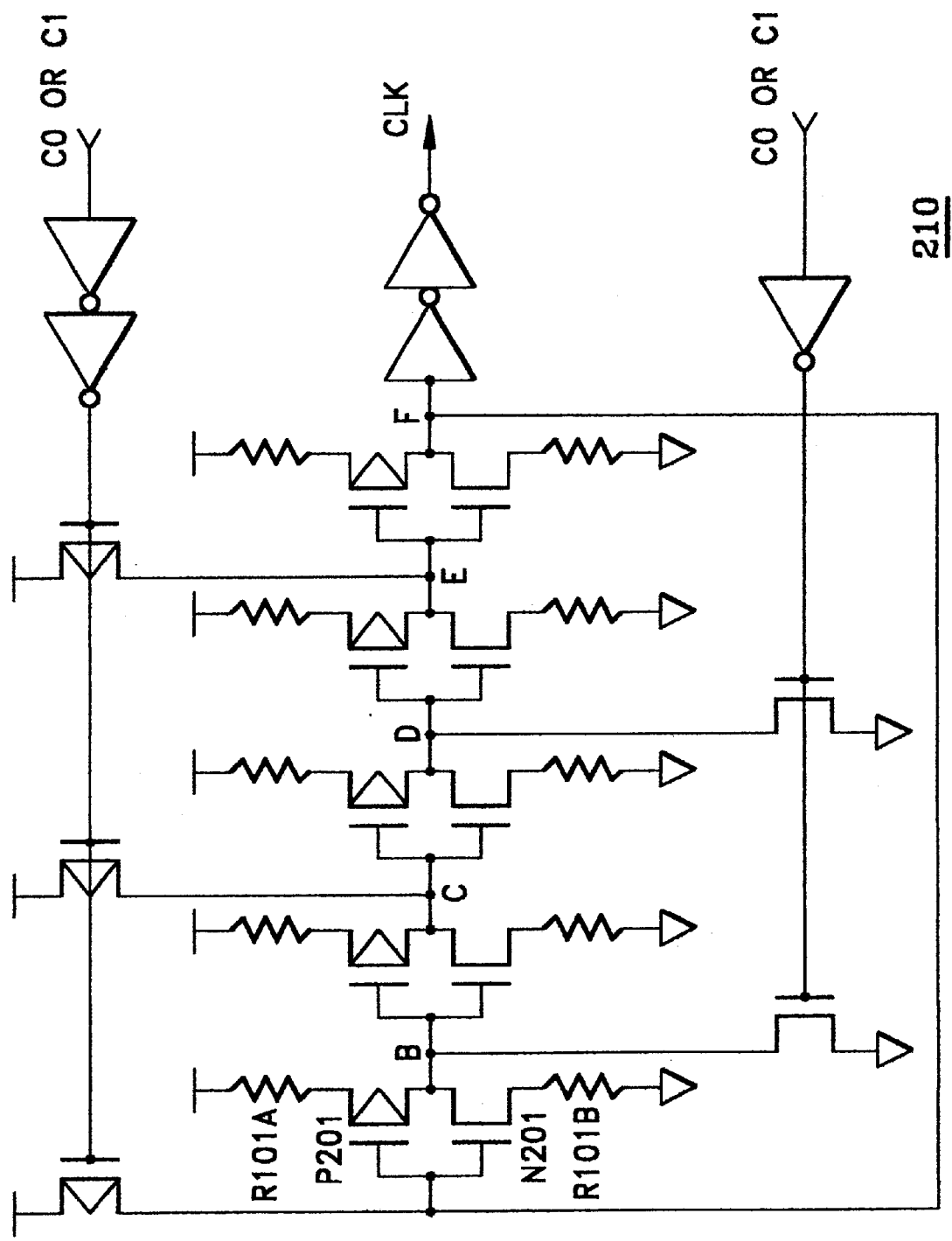
FIG. 5 is a schematic diagram of a ring oscillator 210.

FIG. 5 shows a schematic of an exemplary oscillator 210 which provides an oscillating CLK output. The exemplary oscillator 210 includes five stages which each provide a controllable delay which is reflected at the output node of each stage B, C, D, E and F. Each stage includes resistors R101A and R101B, pMOS transistor switch P201 and NMOS transistor switch N201. Control signals C0 or C1 enable operation of oscillator 210.

Figure 6:
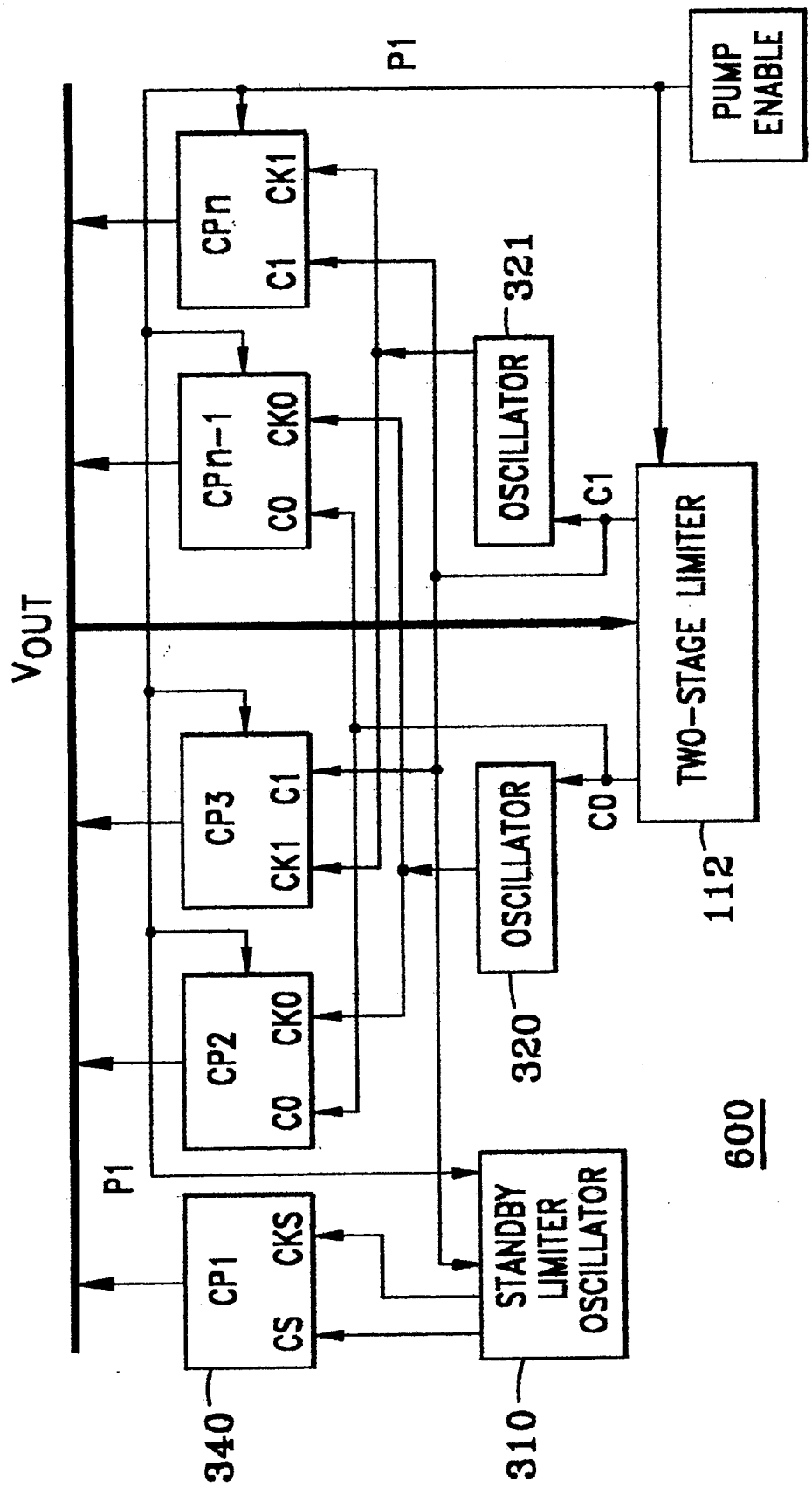
FIG. 6 is a block diagram of a multiple charge pump embodiment of the invention.
Figure 12:
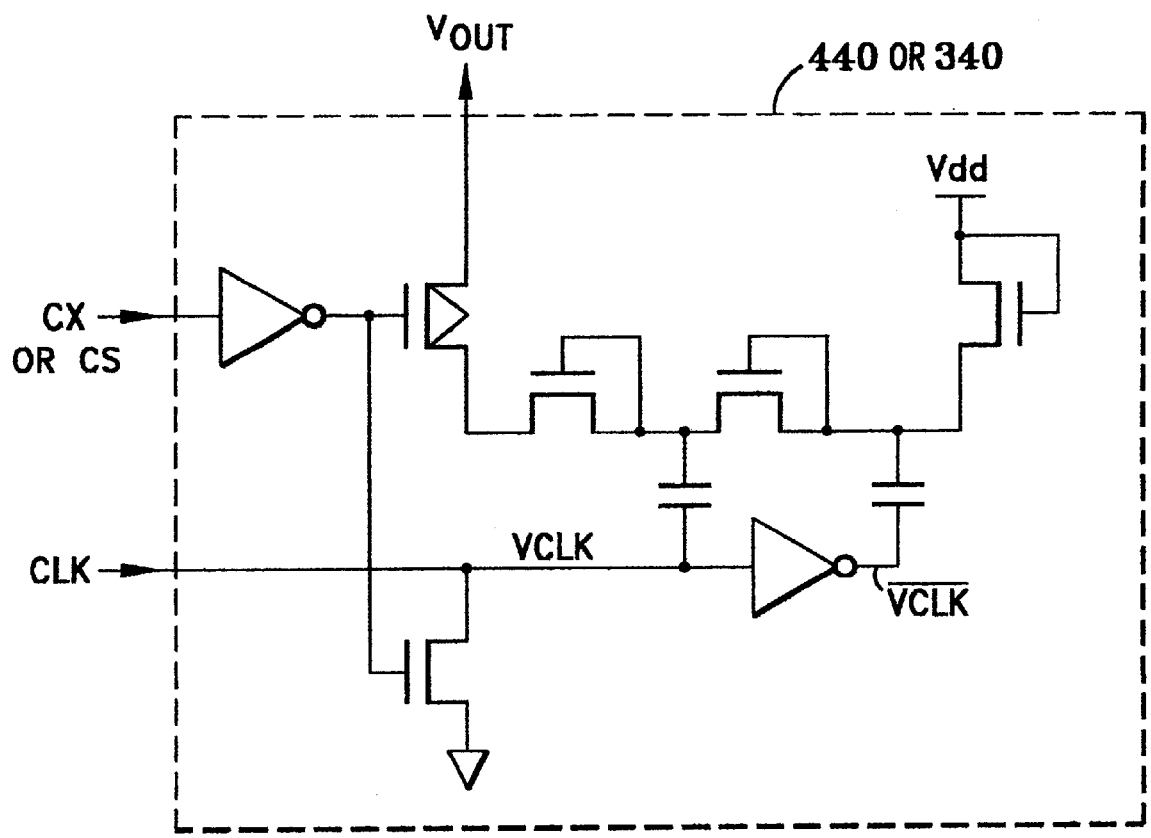
FIG. 12 is a simplified schematic diagram illustrating the construction and control signal interconnection of a dual mode charge pump used in the present invention.

In another embodiment, each group of charge pumps contains multiple charge pumps. Therefore, in embodiment 600 shown in FIG. 6, a first group of charge pumps CP2, CPn−1, etc. are coupled to receive control signal C0, while a second group of charge pumps CP3, CPn, etc. are coupled to receive control signal C1 and a pump enable input P1. Two stage limiter 112 (from FIG. 3) determines the states of control signals C0 and C1 according to the level reached by the voltage supply Vout. Another charge pump CP1 340 is a dual mode charge pump which receives a control signal Cs output from standby limiter/oscillator 310 but not P1. Charge pump CP1 340 is constructed and receives control signals as shown in FIG. 12. It should be noted that neither the P1, C0 or C1 control signals, which are active only during active intervals, are required to enable CP1 340 to operate.

Figure 8:
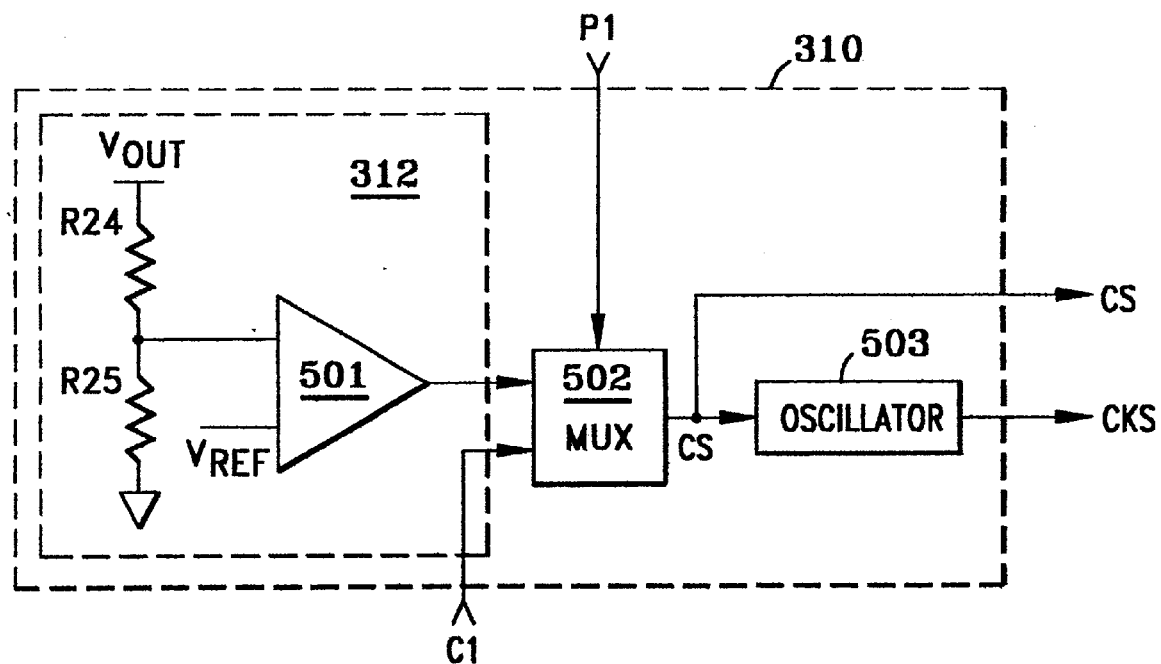
FIG. 8 is a block and schematic diagram of a standby limiter/oscillator 310, as shown in the embodiment of FIG. 6.

The construction of standby limiter/oscillator 310 is shown in FIG. 8. This circuit outputs a standby clock CKS to dual mode charge pump CP1. Limiter 312 generates a standby control signal using a voltage divider using a low current differential amplifier 501 and resistive divider formed by resistors R24 and R25. The resistive divider preferably has a total series resistance about 5 to 20 times greater than the total series resistance of resistors R1, R2, R3 of limiter 112 shown in FIG. 3. The higher resistance of R24, R25 and the low current differential amplifier 501 is desired in order to reduce DC power consumption during the standby interval such as when the integrated circuit is in suspended or sleep mode. On the other hand, the higher current differential amplifiers 30, 40 and lower resistances R1, R2, R3 of active limiter 112 provide for fasting switching of control signals C0, C1 during an active interval.

The output of differential amplifier 501 is selected for output as Cs only during the standby interval when P1 is inactive. Otherwise, control signal C1 is passed to output as control signal Cs during the active interval when P1 is active. Oscillator 503 provides an output frequency to charge pump 340 so long as control signal Cs is active. Therefore, oscillator 503 provides an enabling output frequency CKS to dual mode charge pump 340, regardless of the state of other control signals.

The multiple charge pump system embodiment 600 operates in both active and standby modes. In an active interval (active mode operation), the P1 signal is active, which, as evident from FIG. 3, causes two-stage limiter 112 to output control signals C0 and C1. Control signal C0 controls the operation of each charge pump CP2, Cpn−1 in like manner as charge pump 20 of FIG. 1 is controlled, as described above. Control signal C1 controls the operation of each charge pump CP3, Cpn, in like manner as charge pump 30 of FIG. 1 is controlled, as described above. In an active interval, charge pump CP1 340 operates under control of signal Cs as an active charge pump which assists in delivering charge to Vout.

In a standby interval (standby mode operation), the pump enable (P1) signal is deactivated. This, in turn, disables two stage limiter 112 and oscillators 320, 321. All of the charge pumps, which are "active only" pumps (CP2 . . . Cpn), are then switched off. However, standby limiter oscillator 310 and charge pump CP1 340 continue to operate during the standby interval. The deactivation of P1 causes multiplexer 502 to select the output of standby limiter 312, which is then passed as control signal Cs to oscillator 503. Oscillator 503, in turn, provides the clock output CKS necessary for dual mode charge pump CP1 340 to operate during the standby interval. Charge pump 340 then operates under control of Cs as provided by standby limiter 312 to be switched on and off according to the level reached by the output voltage Vout. Therefore, charge pump 340 operates as a dual mode charge pump which is switched on and off as a function of the voltage level reached by voltage supply Vout during both active and standby intervals.

Figure 7:
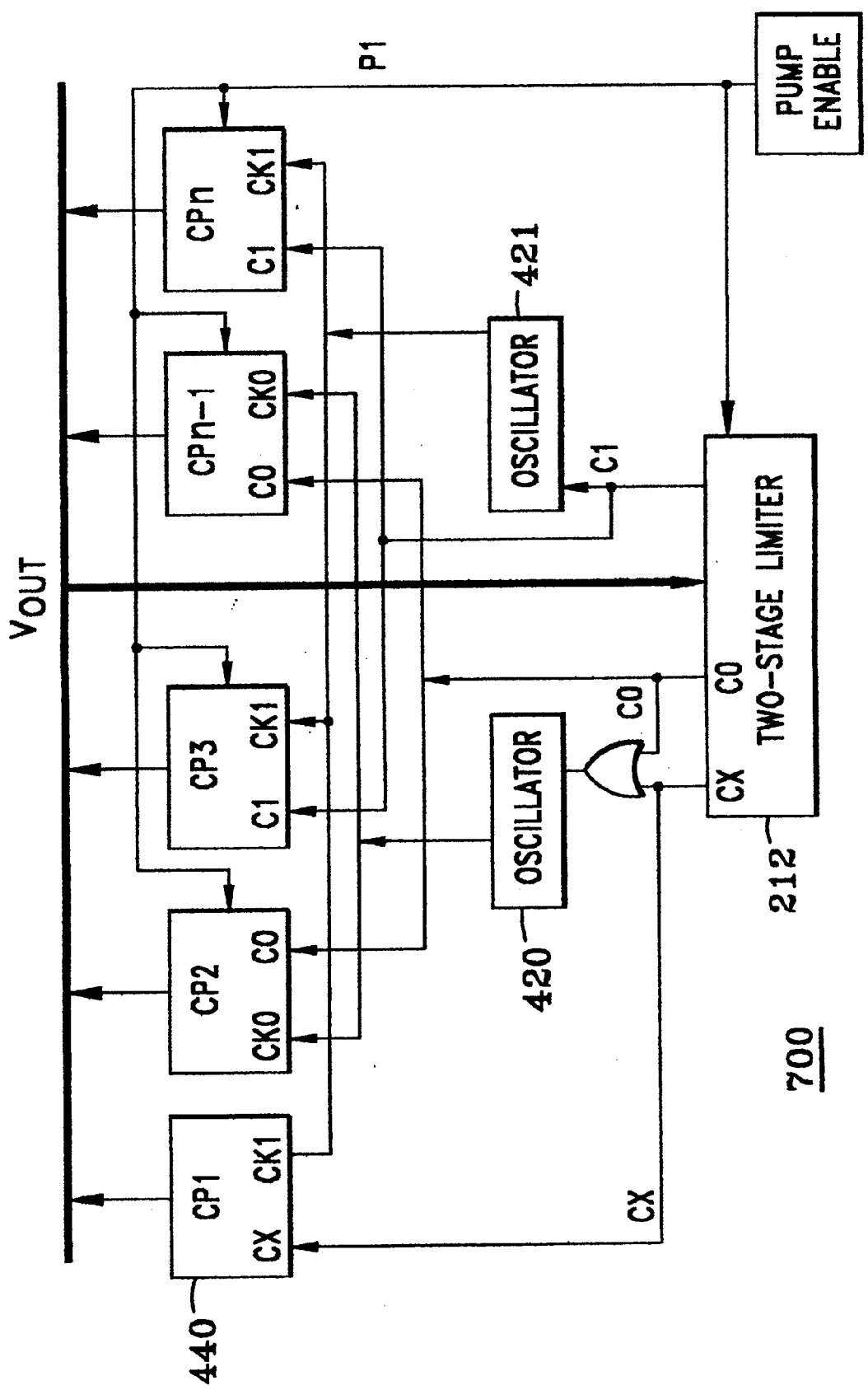
FIG. 7 is a block diagram of another multiple charge pump embodiment of the invention.

FIG. 7 is a block diagram of yet another multiple charge pump embodiment 700. This embodiment differs from embodiment 600 (FIG. 6) in that a dual function two stage limiter 212 (FIG. 4) is used in place of separate limiters 112 and 312 which are used in embodiment 600. Outputs of limiter 212 are coupled to elements as follows: The C0 and C1 control signals, which are identical to the C0 and C1 signals output from limiter 112, are input to charge pumps CP2 . . . Cpn−1; and to CP3 . . . Cpn, respectively, in like manner as in embodiment 600. The generation of the Cx control signal by limiter 212 is described above with reference to FIG. 4. Control signal Cx controls the operation of dual mode charge pump CP1 440 (See FIG. 12) in both active and standby intervals and also provides an enabling input to oscillator 420 when P1 is inactive.

Figure 4:
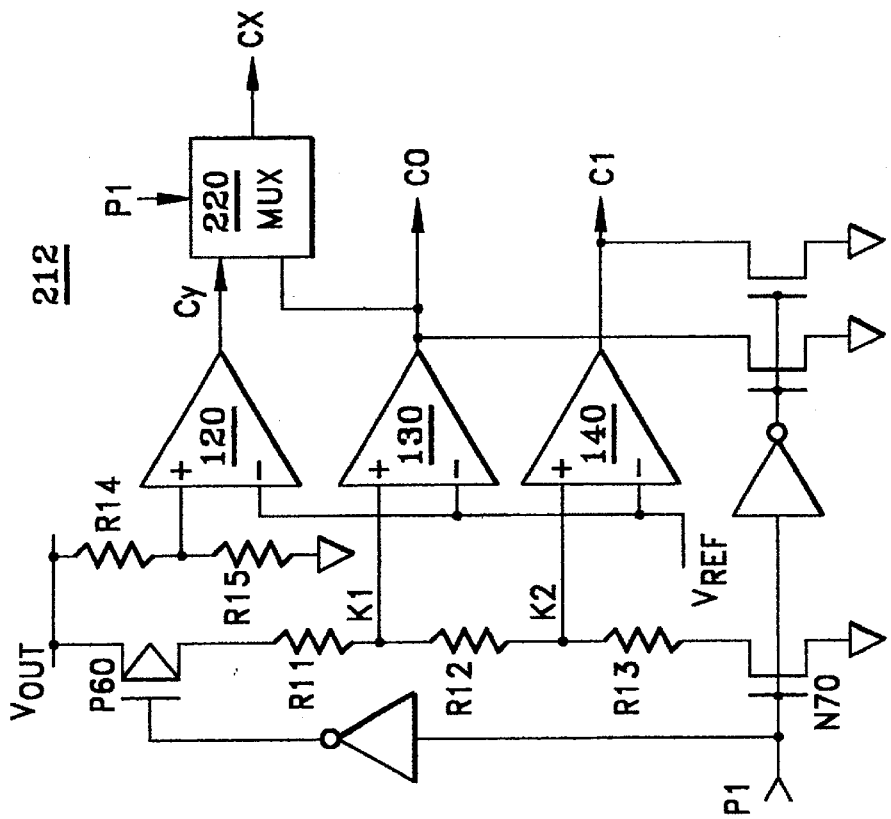
FIG. 4 is a schematic diagram of an alternative two-stage limiter 212.

FIG. 4 shows a schematic drawing of a dual mode limiter 212 which operates in both active and standby operational modes. During the active interval, limiter 212 generates control signals C0 and C1 in identical manner to the manner in which limiter 112 generates signals C0, C1. In addition to the circuitry of limiter 112, limiter 212 includes an additional resistive divider R14 and R15, having higher resistance values, preferably 5 to 20 times greater series resistance, than R11, R12, R13 of limiter 112. In addition, limiter 212 includes a low standby current differential amplifier 120, and a multiplexer 220 which respectively perform the limiting function and select its output during a standby interval. The higher resistances of R14, R15 and the lower current differential amplifier 120 conserve DC power when needed during a standby interval, while the higher current differential amplifiers 130, 140 and lower resistances R11, R12, R13 provide for fasting switching of control signals C0, C1 during an active interval.

During an active interval, multiplexer 220 is responsive to the pump enable signal P1 being active to select the control signal C0 for output as control signal Cx. When P1 is inactive during a standby interval, the output of differential amplifier 120 is passed to output Cx by multiplexer 220.

The multiple charge pump system embodiment 700 operates in both active and standby modes. In an active interval (active mode operation), the P1 signal is enabled, which, as evident from FIG. 4, causes two-stage limiter 212 to output control signals Cx, C0 and C1. Control signal C0 controls the operation of each charge pump CP2, Cpn−1 in like manner as charge pump 20 of FIG. 1 is controlled, as described above. Control signal C1 controls the operation of each charge pump CP3, Cpn, in like manner as charge pump 30 of FIG. 1 is controlled, also as described above. In an active interval, charge pump CP1 440 operates as well to assist in delivering charge to Vout.

In a standby interval (standby mode operation), the pump enable (P1) signal is deactivated. This, in turn, deactivates the C0 and C1 control signals and oscillator 421. All active-only pumps CP2 . . . CPn are then switched off. However, the inactive P1 signal selects the Cy output of differential amplifier 120 as the Cx output of multiplexer 220. The Cx signal then controls the operation of oscillator 420 and charge pump CP1 440 during the standby interval. During the standby interval, the Cx control signal is activated and deactivated according to whether the output voltage Vout lies below or has exceeded a predetermined voltage level determined by resistors R14 and R15. CP1 440 is then switched on and off during the standby interval according to the state of signal Cx. Therefore, CP1 440 operates as a dual mode charge pump which is switched on and off as a function of the voltage level reached by the output voltage Vout during both active and standby intervals.

Those skilled in the art will understand that the principles of the invention apply with trivial modifications to the embodiments described herein to systems which more finely control an output voltage with a limiter having more than two stages and an oscillator having a corresponding number of output frequencies.

While the invention has been described in accordance with certain preferred embodiments thereof, those skilled in the art will recognize the modifications and enhancements which can be made without departing from the true scope and spirit of the present invention.

What is claimed is:

1. A multiple rate charge pump generator system for generating and maintaining the level of a voltage supply generated internally within an integrated circuit, the generator system comprising:

a limiter responsive to said voltage supply reaching a first predetermined voltage level to change the state of a first control signal, and responsive to said voltage supply reaching a second predetermined voltage level to change the state of a second control signal;

a first pump group having at least one charge pump, on-off switching of said first pump group being determined by the state of said first control signal; and a second pump group having a plurality of charge pumps, said second pump group transferring charge to said voltage supply regardless of the state of said first control signal, on-off switching of said second pump group being determined by the state of said second control signal, said plurality of charge pumps including at least one dual mode charge pump which operates as an active charge pump during an active interval together with other charge pumps of said second pump group, said dual mode charge pump operating as a standby charge pump during a standby interval in which it continues to transfer charge to said voltage supply when other charge pumps of said second pump group are off.

2. The generator system of claim 1 further comprising a standby limiter responsive to change in the voltage level of said voltage supply during said standby interval to control on-off switching of said standby charge pump.

3. The generator system of claim 2 wherein said second control signal controls on-off switching of said dual mode charge pump during said active interval.

4. The generator system of claim 1 wherein said limiter is a dual mode limiter comprising an active limiter and a standby limiter, said active limiter responsive to said voltage supply level during an active interval to change the states of said first and second control signals, and said standby limiter responsive during said standby interval to said voltage supply level reaching a third predetermined voltage level to change the state of a third control signal, said third control signal controlling on-off switching of said dual mode charge pump during said standby interval.

5. The generator system of claim 4 wherein said active limiter effects change in said first and second control signals more rapidly than said standby limiter.

6. The generator system of claim 4 wherein said standby limiter draws less current on average than said active limiter.

7. The generator system of claim 4 wherein said active limiter and said standby limiter each include resistive dividers, wherein said resistive divider of said standby limiter includes a total resistance of 5 to 20 times the total resistance of said active limiter.

8. The generator system of claim 2 wherein said active limiter is switched off during said standby interval.

9. The generator system of claim 4 wherein said active limiter is switched off during said standby interval.

* * * * *